(12) United States Patent
Azam et al.

(10) Patent No.: US 10,867,047 B2
(45) Date of Patent: Dec. 15, 2020

(54) BOOTING USER DEVICES TO CUSTOM OPERATING SYSTEM (OS) IMAGES

(71) Applicant: Hewlett-Packard Development Company, L.P., Houston, TX (US)

(72) Inventors: Syed S Azam, Tomball, TX (US); Juan Martinez, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 350 days.

(21) Appl. No.: 15/544,919

(22) PCT Filed: Mar. 11, 2015

(86) PCT No.: PCT/US2015/019961
§ 371 (c)(1),
(2) Date: Jul. 20, 2017

(87) PCT Pub. No.: WO2016/144354
PCT Pub. Date: Sep. 15, 2016

(65) Prior Publication Data
US 2018/0012022 A1 Jan. 11, 2018

(51) Int. Cl.
*G06F 21/57* (2013.01)
*G06F 9/30* (2018.01)
(Continued)

(52) U.S. Cl.
CPC .............. *G06F 21/575* (2013.01); *G06F 9/30* (2013.01); *G06F 9/4406* (2013.01); *G06F 21/45* (2013.01); *G06F 9/4416* (2013.01)

(58) Field of Classification Search
CPC ........ G06F 21/44; G06F 21/30; G06F 21/575; G06F 21/45; G06F 9/4406; G06F 9/4416;
(Continued)

(56) References Cited

U.S. PATENT DOCUMENTS

| 5,349,643 A * | 9/1994 | Cox | G06F 9/4416 |
| | | | 713/155 |
| 6,463,535 B1 * | 10/2002 | Drews | G06F 9/4416 |
| | | | 713/176 |

(Continued)

FOREIGN PATENT DOCUMENTS

WO WO-2012/111018 A1 8/2012

OTHER PUBLICATIONS

Google Cloud Platform, 2014, pp. 1-12, Google, Available at: <cloud.google.com/compute/docs/images>.
(Continued)

*Primary Examiner* — Jaweed A Abbaszadeh
*Assistant Examiner* — Brian J Corcoran
(74) *Attorney, Agent, or Firm* — Fabian VanCott (57) ABSTRACT

Example implementations relate to custom operating system (OS) images. For example, booting a user device to a custom OS image includes presenting a user interface (UI) for creating a custom OS image for portable use, storing the custom OS image on a database for information technology (IT) management purposes, sending, based on a request, the custom OS image from the database to an secure external device, and authenticating, based on a policy, the custom OS image on the secure external device for use on a user device without an OS image or a hard drive disk (HDD).

20 Claims, 5 Drawing Sheets

(51) Int. Cl.
*G06F 9/4401* (2018.01)
*G06F 21/45* (2013.01)

(58) Field of Classification Search
CPC .......... G06F 21/57; G06F 21/51; G06F 21/50;
G06F 21/445; G06F 21/12; G06F 21/121;
G06F 21/123; G06F 21/126; G06F 21/10;
H04L 2209/603; H04L 9/0897
See application file for complete search history.

(56) References Cited

U.S. PATENT DOCUMENTS

| | | | |
|---|---|---|---|
| 7,379,982 B2 | 5/2008 | Tabbara | |
| 8,112,633 B1* | 2/2012 | Clyde | H04L 9/321 |
| | | | 713/176 |
| 9,378,383 B2* | 6/2016 | Sand-Soll | G06F 16/22 |
| 2005/0005096 A1* | 1/2005 | Miller | G06F 9/4416 |
| | | | 713/155 |
| 2006/0047944 A1* | 3/2006 | Kilian-Kehr | G06F 21/575 |
| | | | 713/2 |
| 2006/0129797 A1 | 6/2006 | Durfee et al. | |
| 2008/0082813 A1* | 4/2008 | Chow | G06F 21/34 |
| | | | 713/2 |
| 2008/0163208 A1* | 7/2008 | Burr | G06F 9/45558 |
| | | | 718/1 |
| 2008/0172555 A1* | 7/2008 | Keenan | G06F 9/4406 |
| | | | 713/2 |
| 2008/0209199 A1 | 8/2008 | Sadovsky et al. | |
| 2008/0256536 A1* | 10/2008 | Zhao | G06F 9/45537 |
| | | | 718/1 |
| 2009/0013061 A1* | 1/2009 | Winter | G06F 9/4416 |
| | | | 709/222 |
| 2009/0319782 A1* | 12/2009 | Lee | G06F 21/34 |
| | | | 713/156 |
| 2009/0327675 A1* | 12/2009 | Cherian | G06F 9/4401 |
| | | | 713/1 |
| 2010/0169949 A1* | 7/2010 | Rothman | G06F 21/35 |
| | | | 726/1 |
| 2011/0296408 A1* | 12/2011 | Lo | G06F 8/65 |
| | | | 718/1 |
| 2012/0324067 A1* | 12/2012 | Hari | G06F 13/385 |
| | | | 709/222 |
| 2013/0145440 A1* | 6/2013 | Adam | G06F 21/40 |
| | | | 726/5 |
| 2014/0101426 A1 | 4/2014 | Senthurpandi | |
| 2014/0173215 A1 | 6/2014 | Lin et al. | |
| 2014/0317394 A1 | 10/2014 | Buhler et al. | |
| 2015/0254451 A1* | 9/2015 | Doane | G06F 21/44 |
| | | | 726/1 |
| 2016/0036963 A1* | 2/2016 | Lee | G06F 8/61 |
| | | | 455/418 |
| 2016/0350535 A1* | 12/2016 | Garcia | G06F 21/572 |
| 2017/0109190 A1* | 4/2017 | Sha | G06F 9/45558 |

OTHER PUBLICATIONS

James et al, "The Mobile Execution Environment: A Secure and Non-Intrusive Approach to Implement a Bring You Own Device Policy for Laptops," 2012, pp. 1-11 10th Australian Security Management Conference.

* cited by examiner

BOOTING USER DEVICES TO CUSTOM OPERATING SYSTEM (OS) IMAGES

BACKGROUND

In the modern enterprise workplace, employees of a company work from several locations. The locations may include an office, home, and anywhere necessary while travelling. To allow an employee to work from several locations, the employee may utilize a user device to accomplish work related tasks. The user device may be a laptop, a mobile device, a tablet, a desktop computer, or another user device that aids the employee in accomplishing the work related tasks.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As mentioned above, in the modern enterprise workplace, employees of a company work from several locations. Corporate information technology (IT) departments of the company desire to have their employees access the company's network from secured IT approved work environments via specific user devices. Further, the company may assign an employee one of the specific user devices to aid the employee in accomplishing work related tasks. As a result, the employee may utilize the specific user device while working from several locations.

Often, the specific user devices include a generic operating system (OS). Further, the employee may be unfamiliar with the generic OS. This may lead to lower productivity because of the employee may be unfamiliar with the work environment. Further, the image of the generic OS may be bare bones and may not contain any specialized drivers or specialized applications to aid the employee in accomplishing specific work related tasks. Further, the image of the generic OS cannot be booted from a virtualized environment. As a result, to increase productivity, employees need to work in their own personalized work environment on any user device of their choosing.

The examples described herein include a method for booting a user device to a custom OS image. Such a method includes presenting a user interface (UI) for creating a custom OS image for portable use, storing the custom OS image on a database for IT management purposes, sending, based on a request, the custom OS image from the database to a secure external device, and authenticating, based on a policy, the custom OS image on the secure external device for use on a user device without an OS image or a hard drive disk (HDD). Such a method allows a modular user device concept since the custom OS image and secure external device are independent from the user device. As a result, a user may use a user device without a HDD or OS license to save significant money. This leads to low-cost user devices that can be marketed to drive up user device demands.

As used herein, the term "custom OS image" means a portable operating system that is tailored for a specific user and/or company and is used to boot a user device to. Further, the custom OS image may include applications and drivers. The custom OS image may be stored on a database. The custom OS image may be downloaded from the database to a secure external device. The custom OS image may be dynamic in nature such that the custom OS image may be modified. As a result, the custom OS image is not static.

As used herein, the term "policy" means rules for allowing a user device to boot to a custom OS image. If the policy determines the custom OS image is valid, the user device may boot to the custom OS image.

As used herein, the term "secure external device" means a portable memory system capable of storing data and is not permanently fixed to a user device. The secure external device may store, in memory, a custom OS image. Further, the secure external device may encrypt the stored data.

As used herein, the term "user device" means a computer system that boots to a custom OS image. The user device may be a bare metal user device. The bare metal user device does not include an OS image or a HDD. The user device may be a virtual user device. The virtual user device may be a virtual environment. The user device may be a standard user device. The standard user device includes an OS image and a HDD.

As used herein, the term "booting purposes" means a process of the initialization of a user device. The booting purposes may include loading a custom OS image, applications, drivers, or other system programs onto the user device.

Further, as used herein, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It is apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
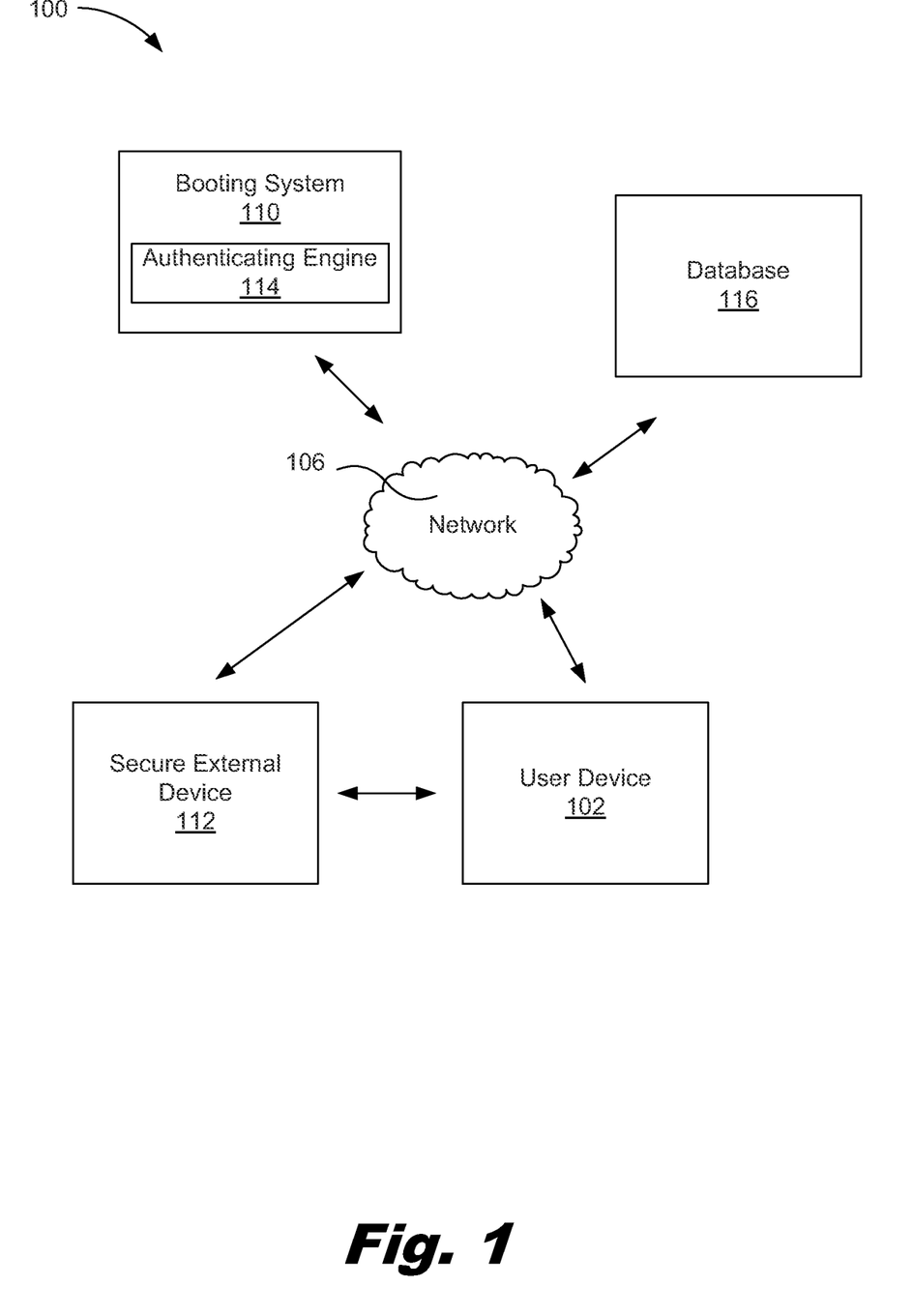
FIG. 1 is a diagram of a system for booting a user device to a custom operating system (OS) image, according to an example.

Referring now to the figures, FIG. 1 is a diagram of an example of a system for booting a user device to a custom OS image, according to an example. As described below, a booting system is in communication with a network to present a UI for creating a custom OS image for portable use. Further, the booting system stores the custom OS image on a database for IT management purposes. The booting system sends, based on a request, the custom OS image from the database to a secure external device. Further, the booting system authenticates, based on a policy, the custom OS image on the secure external device for use on a user device without an OS image or a HDD.

As illustrated, the system (100) includes a database (116). As described in other parts of this specification, the database (116) stores, in memory, a number of custom OS images. The custom OS images may be specific to users and/or companies.

Further, the system (100) includes a secure external device (112). The secure external device (112) may be a portable memory system capable of storing data and is not permanently fixed to a user device (102). The secure external device (112) may store, in memory, a custom OS image for portable use.

As illustrated, the system (100) includes a user device (102). The user device (102) may be a computer system that does not include an OS image or a HDD. The user device (102) may use the custom OS image from the secure external device (112) to boot to. More information about the user device (102) is described in other parts of this specification.

The system (100) further includes a booting system (110). The booting system (110) may be a computing device that includes a processor and computer program code. The booting system (110) may be a computing device such as server, a user device, a tablet, a smartphone, or other computing devices. The booting system (110) may be in communication with the database (116), the secure external device (112), and the user device (102) over a network (106).

The booting system (110) presents a UI for creating a custom OS image for portable use. As described below, a user and/or a company may create the custom OS image via the UI. Further, the custom OS image includes at least one application, at least one driver, or combinations thereof.

The booting system (110) stores the custom OS image on the database (116) for IT management purposes. As a result, the custom OS image may be maintained throughout its lifecycle.

Further, the booting system (110) sends, based on a request, the custom OS image from the database (116) to a secure external device (112). The request may be received by the booting system (110) at time of purchase of the secure external device (112). The request may be received by the booting system (110) when the secure external device (112) is connected to the user device (102).

The booting system (110) further authenticates, based on a policy, the custom OS image on the secure external device (112) for use on the user device (102) without an OS image or a HDD. An authenticating engine (114) may authenticate the custom OS image based on the policy set by the user and/or company. As described below, the policy may include a geolocation policy, a user based policy, a restriction policy, a biometric policy, a password policy, a time policy, a release policy, a subscription policy, or combinations thereof. Such a system allows a modular user device concept since the custom OS image and secure external device are independent from the user device. As a result, a user may use a user device without a HDD or OS license to save significant money. This leads to low-cost user devices that can be marketed to drive up user device demands. More information about the booting system (110) is described later on in this specification.

While this example has been described with reference to the booting system being located over the network, the booting system may be located in any appropriate location according to the principles described herein. For example, the booting system may be located on a server, a user device, a database, a secure external device, other locations, or combinations thereof.

Figure 2:
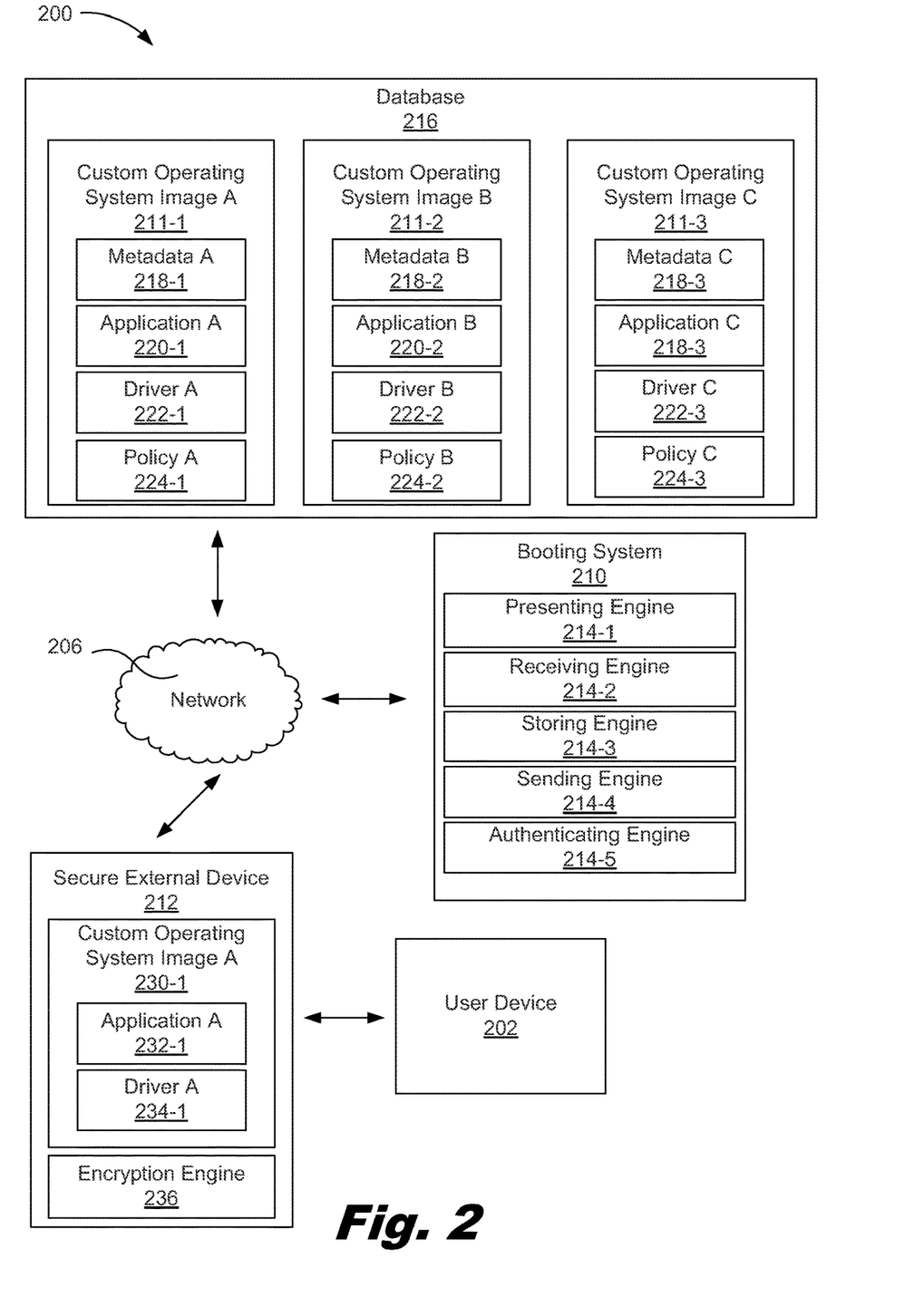
FIG. 2 is a diagram of a system for booting a user device to a custom OS image, according to an example.

FIG. 2 is a diagram of an example of a system for booting a user device to a custom OS image, according to an example. As described below, a booting system is in communication with a network to present a UI for creating a custom OS image for portable use. Further, the booting system stores the custom OS image on a database for IT management purposes. The booting system sends, based on a request, the custom OS image from the database to a secure external device. Further, the booting system authenticates, based on a policy, the custom OS image on the secure external device for use on a user device without an OS image or a HDD.

As illustrated, the system (200) includes a database (216). The database (216) stores in memory a number of custom OS images (211). As illustrated, the database (216) stores custom OS image A (211-1), custom OS image B (211-2), and custom OS image C (211-3). Each of the custom OS images (211) may be specific to a user, groups of users, and/or a company.

In some examples, the custom OS images (211) may be created by a user. To create the custom OS images (211), a UI may be presented to a user on a user device (202). The UI may include specific methods and tools for creating the custom OS images (211). For example, the UI may include a number of drop down boxes. The drop down boxes allow the user to select specific applications, policies, and drivers for the custom OS images (211). The UI may include a number of radio buttons. By selecting the radio buttons, the radio buttons allow the user to select specific applications, policies, and drivers for the custom OS images (211). The UI may include a submit button. Once the user has selected the specific applications, policies, and drivers for a custom OS image, the user may select on the submit button. Once the submit button is selected, the custom OS image is uploaded to the database (216).

In other examples, the custom OS images (211) may be created by a company. The company may create the custom OS images (211) based on specific employee needs. Further, the company may create generic OS images that may suite the needs of generic employees. The company may create the custom OS images (211) utilizing the same process as described above.

In other examples, the custom OS images (211) may be created by a third party. A user may specify details about a custom OS image and the third party may create the custom OS image per the user's specified details. The third party may create the custom OS image utilizing the same process as described above. In some examples, the third party may be an organization that owns the database (216).

As illustrated, each of the custom OS images (211) includes metadata (218). For example, custom OS image A (211-1) includes metadata A (218-1), custom OS image B (211-2) includes metadata B (218-2), and custom OS image C (211-3) includes metadata C (218-3). Although the metadata (218) does not provide functionality when the user device (202) is booted to the custom OS image (211), the metadata (218) may be used for identification purposes. For example, metadata A (218-1) may specify that custom OS image A (211-1) can only be accessed by user X from company X. Further, metadata the A (218-1) may store information about a user using the custom OS image A (211-1). For example, the information may include if the user has paid a monthly subscription fee in order to access custom OS image A (211-1).

Further, each of the custom OS images (211) includes applications (220). For example, custom OS image A (211-1) includes application A (220-1), custom OS image B (211-2) includes application B (220-2), and custom OS image C (211-3) includes application C (220-3). The applications (220) may be a set of one or more computer programs designed to carry out operations or specific tasks.

The applications (220) may include word processing applications, spreadsheet applications, file management applications, internet applications, accounting applications, media applications, enterprise applications, educational applications, simulation applications, entertainment applications, other applications, or combinations thereof. The applications (220) may be proprietary or open-sourced. Further, the applications (220) may be dependent on program code of the user device (202).

Further, each of the custom OS images (211) includes drivers (222). For example, custom OS image A (211-1) includes drivers A (222-1), custom OS image B (211-2) includes drivers B (222-2), and custom OS image C (211-3) includes drivers C (222-3). The drivers (222) may be a computer program that operates or controls a particular type of device that is attached to the user device (202). For example, the drivers (222) provide a program code interface for hardware devices. This enables operating systems and other computer programs to access hardware functions of the user device (202) without needing to know precise details of the hardware being used.

As illustrated, each of the custom OS images (211) includes a policy (224). For example, custom OS image A (211-1) includes policy A (224-1), custom OS image B (211-2) includes policy B (224-2), and custom OS image C (211-3) includes policy C (224-3). As described below, the policies (224) may include a geolocation policy, a user based policy, a restriction policy, a biometric policy, a password policy, a time policy, a release policy, a subscription policy, or combinations thereof. Further, the policy may be set by the user and/or the company.

As illustrated, the system (200) includes a secure external device (212). The secure external device (212) may be a portable memory system capable of storing data and is not permanently fixed to a user device (202). As illustrated, the secure external device (212) may store, in memory, a custom OS image downloaded from the database (216). In an example, custom OS image A (211-1) may be downloaded from the database (216) and stored on the secure external device (212) as custom OS image A (230-1). As illustrated, custom OS image A (230-1) may include application A (232-1) and driver A (234-1). The secure external device (112) may be a universal serial bus (USB) device. Further, the custom OS image may be managed separately from hardware. The secure external device (212) may include an encryption engine (236). The encryption engine (236) may refer to a combination of hardware and program instructions to perform a designated function. In one example, the encryption engine (236) encrypts data stored on the secure external device (212). For example, the encryption engine (236) encrypts custom OS image A (230-1), application A (232-1), and driver A (234-1). As a result, data cannot be compromised if the secure external device (212) is lost or stolen. As described below, the secure external device (112) may connect to the user device (202).

Further, the system (200) includes the user device (202). The user device (202) may be a computer system that boots to a custom OS image. The user device (202) may be a bare metal user device. The bare metal user device does not include an OS image or a HDD. The user device (202) may be a virtual user device. The virtual user device may be a virtual environment. A user device that is a virtual user device allows a custom OS image to boot to any system. The user device (202) may be a standard user device. The standard user device includes an OS image and a HDD. The user device (102) may use custom OS image A (230-1) from the secure external device (112) to boot to. For example, once the secure external device (212) is connected to the user device (202), the user device (202) boots to OS image A (230-1). As a result, the user device may utilize application A (232-1) and driver A (234-1).

The system (200) further includes a booting system (210). In one example, the booting system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the booting system (210) includes a presenting engine (214-1), a receiving engine (214-2), a storing engine (214-3), a sending engine (214-4), and an authenticating engine (214-5).

The presenting engine (214-1) presents a UI for creating a custom OS image for portable use. The presenting engine (214-1) may present the UI to a user and/or a company as described above. Once the custom OS image is created, the custom OS image is uploaded to the database (216).

The receiving engine (214-2) receives a policy. The policy may be specific to a user and/or a company. Further, the policy may be set by the user and/or the company. The policy may include a geolocation policy. The geolocation policy may specify that a custom OS image may be approved for use if the user device is located in a specific geographic location. The specific geographic location may include a specific town, a specific city, a specific state, a specific country, a specific continent, or a specific hemisphere. In an example, the geolocation policy uses location coordinates of the secure external device (212) to determine where the secure external device (212) is located. This may be accomplished via a global positing system (GPS). If the secure external device (212) is located within approved location coordinates, the custom OS image may be approved for use. However, if the secure external device (212) is located outside of approved location coordinates, the custom OS image may not be approved for use. In some examples the location coordinates may be determined by the booting system (210) once the secure external device (212) is connected to the user device (202).

The policy may include a user based policy. The user based policy may specify that a custom OS image may be approved for use by specific users. For example, the user based policy may specify that a custom OS image may be approved for use by user A and user B may. As a result, if user C tries to use the custom OS image, user C is denied access to the custom OS image.

The policy may include a restriction policy. The restriction policy may specify that a custom OS image may be approved for use by all users in department X of company X. As a result, any user belonging to department X of company X may access the custom OS image. Further, the restriction policy may indicate that after a specific number of failed authentication attempts, the booting system (210) is to take an action. The action may include restricting access to the custom OS image for a duration of time. The duration of time may be days, hours, minutes, or combinations thereof.

The policy may include a biometric policy. The biometric policy may specify that a custom OS image may be approved for use by users meeting specific biometric parameters. Biometric parameters may include finger prints, retinal information, height, weight, other biometric parameters, or combinations thereof. As a result, any user meeting the biometric parameters may access the custom OS image.

The policy may include a password policy. The password policy may specify that a custom OS image may be approved for use by users that can specify a predetermined password. The predetermined password may include combinations of letters, numbers, and symbols that the user specifics to gain access to the custom OS image.

The policy may include a time policy. The time policy specifies that a custom OS image may be approved for use by users at specific duration of time and/or a specific time. The specific duration of time may specify that the custom OS image may be approved for use until an expiration date has been reached. For example, the specific duration of time may specify that the custom OS image may be approved for use until date X. After date X the custom OS image may no longer be approved for use. The specific time may restrict the custom OS image for booting purposes and/or authentication purposes to specific hours and/or days. For example, an IT manager may restrict the custom OS image for booting purposes and/or authentication purposes to 8:00 am to 5:00 pm every day except Sunday. The specific duration of time and/or a specific time may include years, months, weeks, days, hours, minutes, seconds, or combinations thereof.

The policy may include a release policy. The release policy specifies that a custom OS image may be approved for use by users after a release date of a custom OS image. For example, the release policy specifies a user may not access the custom OS image until after date Y. As a result, if a user tries to access the custom OS image before date Y, the user is denied access to the custom OS image.

The policy may include a subscription policy. The subscription policy specifies that a custom OS image may be approved for use by users if the user has paid a monthly subscription fee.

The storing engine (214-3) stores the custom OS image on the database (216) for IT management purposes. The IT management purposes include creating, updating, and deleting of an application or a driver of a custom OS image. In some examples, the custom OS image is updated when the secure external device (212) is first connected to the user device (202). Further, the custom OS image may be stored in an .iso format. .iso is a file extension to indicate the encoding of the custom OS image. Further, .iso indicates the custom OS image is an archive file.

The sending engine (214-4) sends, based on a request, the custom OS image from the database (216) to a secure external device (212). The request may be made when the user purchases the secure external device (212). The request may be made when the custom OS image is modified. This may include updating the custom OS images (211), updating the applications (220), updating the drivers (222), updating the metadata (218), updating the policies (224), or combinations thereof. Further, the users and/or company can download or upload any custom OS image to which they have access to. The custom OS images on the secure external device (212) are encrypted so data cannot be compromised if the secure external device (212) is lost or stolen.

The authenticating engine (214-5) authenticates, based on a policy, the custom OS image on the secure external device (212) for use on a user device (202) without an OS image or a HDD. The authenticating engine (214-5) authenticates, based on the policy, the custom OS image on the secure external device (212) for use on the user device (202) without the OS image or the HDD by approving the custom OS image for booting purposes of the user device (202) or prohibiting the custom OS image for the booting purposes of the user device (202). This authentication can be program code-based or can be used in conjunction with a hardware Trusted Platform Module (TPM). A user can set specific policy driven consequences for failed authentication. The consequences may include denying access to the custom OS image after a number of failed attempts.

In an example, the custom OS image can be used in two situations. The first is on a user device such as a bare metal user device without an OS image or HDD. The user device will boot to the custom OS image on the secure external device (212) when it is connected into a USB port of the user device (202). The second is through a hypervisor in a virtualized environment. The custom OS image is a guest OS.

An overall example of FIG. 2 will now be described. The presenting engine (214-1) presents a UI for creating a custom OS image for portable use. In this example, custom OS image A (211-1) is created. The receiving engine (214-2) receives policy A (224-1) for custom OS image A (211-1). The storing engine (214-3) stores custom OS image A (211-1) on the database (216) for IT management purposes. The sending engine (214-4) sends, based on a request, custom OS image A (211-1) from the database (216) to a secure external device (212). The authenticating engine (214-5) authenticates, based on policy A (224-1), custom OS image A (230-1) on the secure external device (212) for use on a user device (202). As a result, the user device (202) boots to custom OS image A (230-1) on the secure external device (212) when the secure external device (212) is connected to the user device (202).

Figure 3:
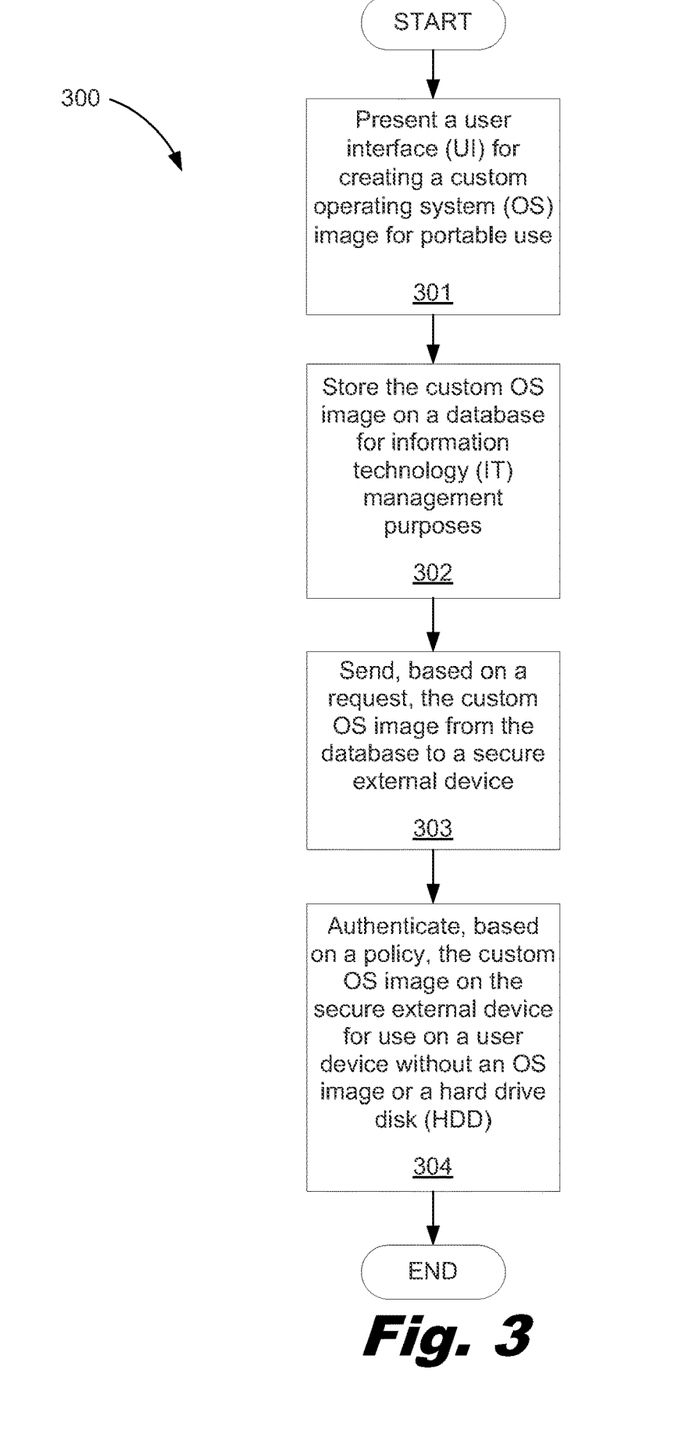
FIG. 3 is a flowchart of a method for booting a user device to a custom OS image, according to an example.

FIG. 3 is a flowchart of an example of a method for booting a user device to a custom OS image, according to an example. The method (300) may be executed by the booting system of FIG. 1. The method (300) may be executed by other systems such as system 200, system 500, or system 600. In this example, the method (300) includes presenting (301) a UI for creating a custom OS image for portable use, storing (302) the custom OS image on a database for IT management purposes, sending (303), based on a request, the custom OS image from the database to an secure external device, authenticating (304), based on a policy, the custom OS image on the secure external device for use on a user device without an OS image or a HDD.

As mentioned above, the method (300) includes presenting (301) a UI for creating a custom OS image for portable use. The UI may allow a user, a company, or a third party to create a custom OS image as described above. The custom OS image may be created for a specific user. The custom OS image may be created for a group of users. The custom OS image may be created for a specific company. Once the custom OS image is created, the custom OS image is uploaded to a database.

As mentioned above, the method (300) includes storing (302) the custom OS image on a database for IT management purposes. The IT management purposes include creating, updating, and deleting of an application or a driver of the custom OS image.

As mentioned above, the method (300) includes sending (303), based on a request, the custom OS image from the database to a secure external device. The method (300) may send the custom OS image to the secure external device based on an event. The event may include a time of purchase, when the custom OS image is updated, when the secure external device is connected to the user device, other events or combinations thereof.

As mentioned above, the method (300) includes authenticating (304), based on a policy, the custom OS image on the secure external device for use on a user device without an OS image or a HDD. Authenticating, based on the policy, the custom OS image on the secure external device for use on the user device without the OS image or the HDD includes approving the custom OS image for booting purposes of the user device or prohibiting the custom OS image for the booting purposes of the user device.

Figure 4:
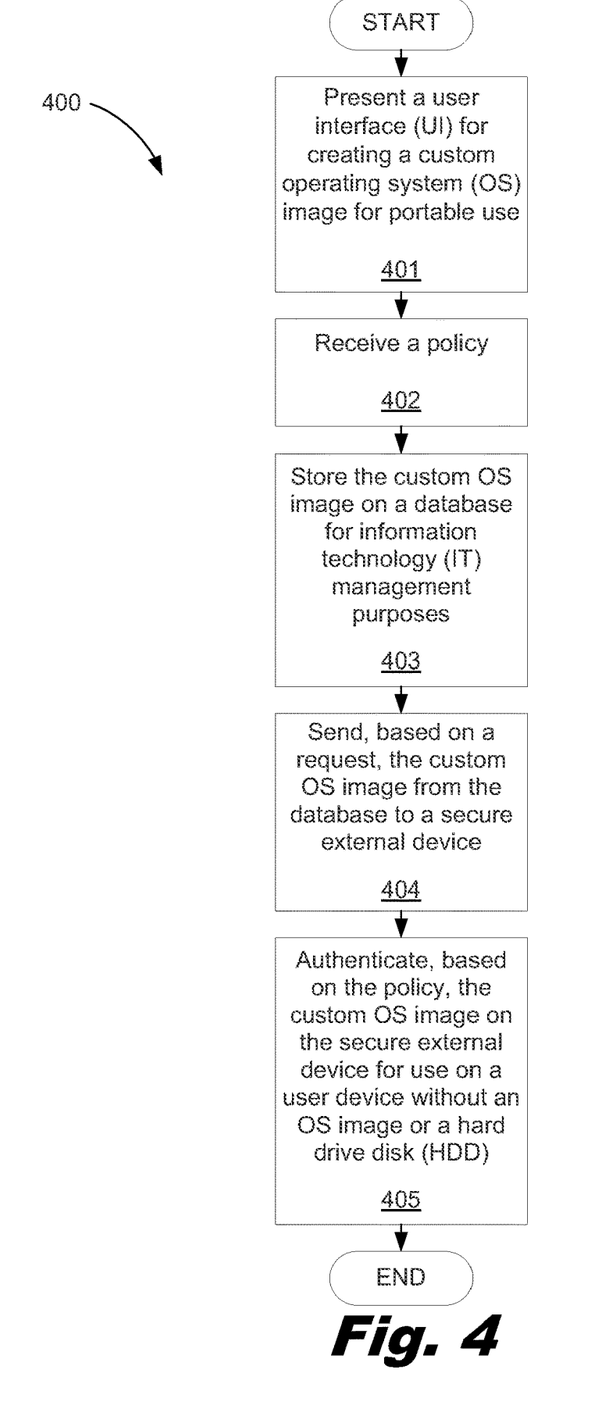
FIG. 4 is a flowchart of a method for booting a user device to a custom OS image, according to an example.

FIG. 4 is a flowchart of an example of a method for booting a user device to a custom OS image, according to an example. The method (400) may be executed by the booting system of FIG. 1. The method (400) may be executed by other systems such as system 200, system 500, or system 600. In this example, the method (400) includes presenting (401) a UI for creating a custom OS image for portable use, receiving (402) a policy, storing (403) the custom OS image on a database for IT management purposes, sending (404), based on a request, the custom OS image from the database to an secure external device, and authenticating (405), based on a policy, the custom OS image on the secure external device for use on a user device without an OS image or a HDD.

As mentioned above, the method (400) includes receiving (402) a policy. The policy may be modified at any time as specified by a user and/or a company. The policy may be modified by deleting an existing policy and replacing the old policy with a new policy. As a result, the policy may be modified to create a new policy.

Figure 5:
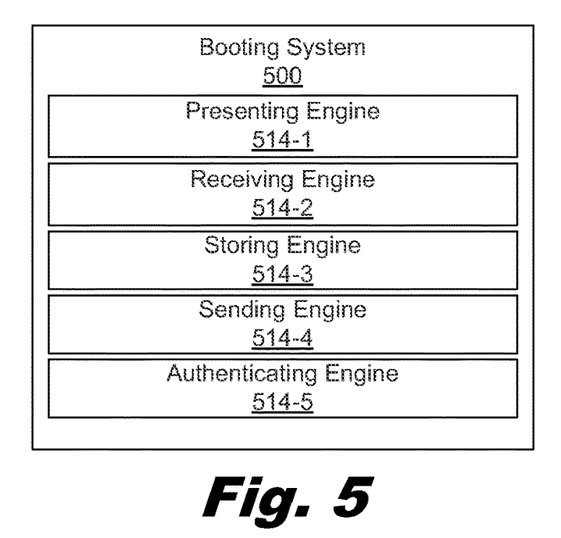
FIG. 5 is a diagram of a booting system, according to an example.

FIG. 5 is a diagram of a booting system, according to an example. The booting system (500) includes a presenting engine (514-1), a receiving engine (514-2), a storing engine (514-3), a sending engine (514-4), and an authenticating engine (514-5). The engines (514) refer to a combination of hardware and program instructions to perform a designated function. Alternatively, the engines (514) may be implemented in the form of electronic circuitry (e.g., hardware). Each of the engines (514) may include a processor and memory. Alternatively, one processor may execute the designated function of each of the engines (514). The program instructions are stored in the memory and cause the processor to execute the designated function of the engine.

The presenting engine (514-1) presents a UI for creating a custom OS image for portable use. The presenting engine (514-1) may present the UI to a user, a group of users, a company, or a third party.

The receiving engine (514-2) receives a policy. The policy receiving engine (514-2) receives one policy for each custom OS image. The policy receiving engine (514-2) receives several policies for each custom OS image.

The storing engine (514-3) stores the custom OS image on a database for IT management purposes. The storing engine (514-3) stores the custom OS image on a database for IT management purposes for several users and/or companies.

The sending engine (514-4) sends, based on a request, the custom OS image from the database to a secure external device. The sending engine (514-4) sends one custom OS image from the database to one secure external device. The sending engine (514-4) sends several custom OS image from the database to one secure external device. The sending engine (514-4) sends one custom OS image from the database to several secure external devices. The sending engine (514-4) sends several custom OS image from the database to several secure external devices.

The authenticating engine (514-5) authenticates, based on a policy, the custom OS image on the secure external device for use on a user device without an OS image or a HDD. The authenticating engine (514-5) authenticates, based on a policy, the custom OS image on the secure external device for use on a user device such as a virtual user device. The authenticating engine (514-5) authenticates, based on a policy, the custom OS image on the secure external device for use on a user device such as a standard user device.

Figure 6:
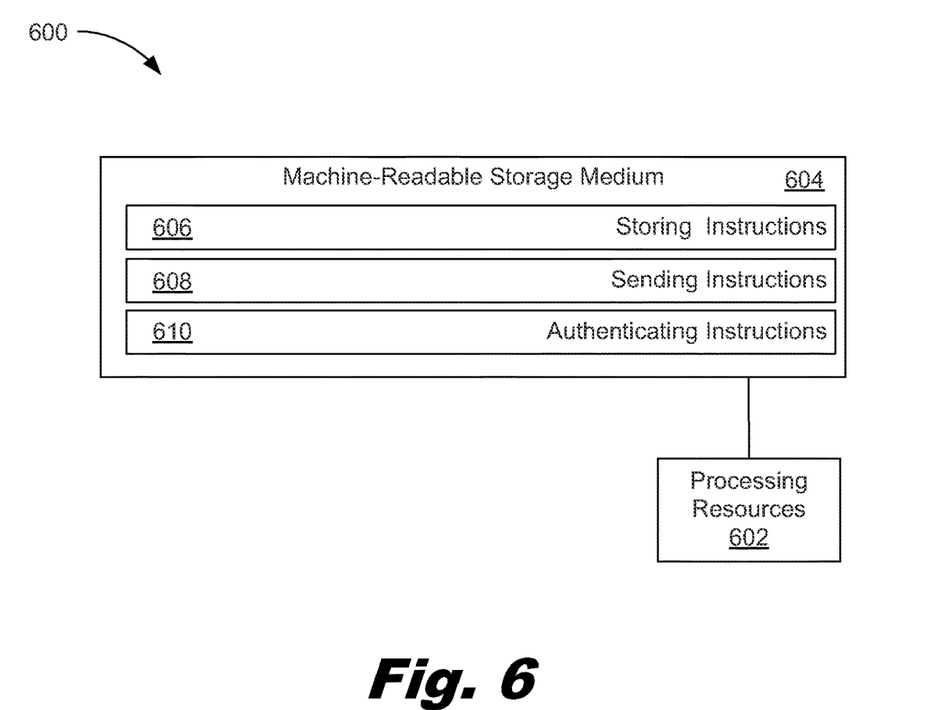
FIG. 6 is a diagram of a booting system, according to an example.

FIG. 6 is a diagram of a booting system, according to an example. In this example, the booting system (600) includes resource(s) (602) that are in communication with a machine-readable storage medium (604). Resource(s) (602) may include one processor. In another example, the resource(s) (602) may further include at least one processor and other resources used to process instructions. The machine-readable storage medium (604) represents generally any memory capable of storing data such as instructions or data structures used by the booting system (600). The instructions shown stored in the machine-readable storage medium (604) include storing instructions (606), sending instructions (608), and authenticating instructions (610).

The machine-readable storage medium (604) contains computer readable program code to cause tasks to be executed by the resource(s) (602). The machine-readable storage medium (604) may be tangible and/or physical storage medium. The machine-readable storage medium (604) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The storing instructions (606) represents instructions that, when executed, cause the resource(s) (602) to store the custom OS image on a database for IT management purposes. The sending instructions (608) represents instructions that, when executed, cause the resource(s) (602) to send, based on a request, the custom OS image from the database to an secure external device. The authenticating instructions (610) represents instructions that, when executed, cause the resource(s) (602) to authenticate, based on a policy, the custom OS image on the secure external device for use on a user device without an OS image or a HDD.

Further, the machine-readable storage medium (604) may be part of an installation package. In response to installing the installation package, the instructions of the machine-readable storage medium (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (602) and the machine-readable storage medium (604) are located within the same physical component, such as a server, or a network component. The machine-readable storage medium (604) may be part of the physical component's main memory, caches, registers, non-volatile memory, or elsewhere in the physical component's memory hierarchy. Alternatively, the machine-readable storage medium (604) may be in communication with the resource(s) (602) over a network. Further, the data structures, such as the libraries, may be accessed from a remote location over a network connection while the programmed instructions are located locally. Thus, the booting system (600) may be implemented on a user device, on a server, on a collection of servers, or combinations thereof.

The booting system (600) of FIG. 6 may be part of a general purpose computer. However, in alternative examples, the booting system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method implemented by a booting system to boot a user device to a custom operating system (OS) image, the method comprising:
   with the booting system of a server:
      presenting a user interface (UI) for creating the custom OS image for portable use;
      storing the custom OS image on a database for information technology (IT) management purposes;
      sending, based on an event where a secure external device is connected to the user device, the custom OS image from the database to the secure external device; and
      authenticating, based on a policy, the custom OS image on the secure external device for use on the user device without an OS image or a hard drive disk (HDD).

2. The method of claim 1, further comprising receiving the policy.

3. The method of claim 2, wherein the policy indicates a time window during which the custom OS image is bootable.

4. The method of claim 2, wherein the policy indicates that the custom OS image is approved for use by users meeting specific biometric parameters.

5. The method of claim 2, wherein the policy indicates a duration of use for the custom OS image.

6. The method of claim 1, wherein the policy comprises a geolocation policy, a user based policy, a restriction policy, a biometric policy, a password policy, a time policy, a release policy, a subscription policy, or combinations thereof.

7. The method of claim 1, wherein the custom OS image includes at least one application, at least one driver, or combinations thereof.

8. The method of claim 1, wherein the IT management purposes comprise creating, updating, and deleting of an application or a driver of the custom OS image.

9. The method of claim 1, wherein authenticating, based on the policy, the custom OS image on the secure external device for use on the user device without the OS image or the HDD comprises approving the custom OS image for booting purposes of the user device or prohibiting the custom OS image for the booting purposes of the user device.

10. The method of claim 1, wherein metadata associated with the custom OS image indicates whether a user has paid a monthly subscription fee for access to the custom OS image.

11. A system for booting a user device to a custom operating system (OS) image, the system comprising:
   a presenting engine to present a user interface (UI) for creating the custom OS image for portable use;
   a policy receiving engine to receive a policy;
   a storing engine to store the custom OS image on a database for information technology (IT) management purposes;
   a sending engine to send, based on an event where a secure external device is connected to the user device, the custom OS image from the database to the secure external device; and
   an authenticating engine to authenticate, based on the policy, the custom OS image on the secure external device for use on the user device without an OS image or a hard drive disk (HDD) by approving the custom OS image for booting by the user device.

12. The system of claim 11, wherein the policy comprises a geolocation policy which indicates a specific geographic location where the custom OS image is approved for use.

13. The system of claim 12, wherein the policy relies on location coordinates of the secure external device to determine the specific geographic location where the custom OS image is approved for use.

14. The system of claim 11, wherein the custom OS image includes at least one application, at least one driver, or combinations thereof.

15. The system of claim 11, wherein the IT management purposes comprise creating, updating, and deleting of an application or a driver of the custom OS image.

16. The system of claim 11, wherein the authenticating engine prohibits the custom OS image for booting purposes of the user device.

17. A machine-readable storage medium encoded with instructions for booting a user device to a custom operating system (OS) image, the instructions executable by a processor of a system to cause the system to:
   store the custom OS image on a database for information technology (IT) management purposes, wherein metadata in the custom OS image indicates users who may access the custom OS image;
   send, based on an event where a secure external device is connected to the user device, the custom OS image from the database to the secure external device;
   authenticate, based on a policy and responsive to a global positioning system (GPS) of the secure external device transmitting approved location coordinates of the secure external device, the custom OS image on the secure external device for use on the user device without an OS image or a hard drive disk (HDD) by approving the custom OS image for booting by the user device; and
   update, based on the secure external device being connected to the user device, the custom OS image.

18. The machine-readable storage medium of claim 17, further comprising instructions that, when executed, cause the processor to present a user interface (UI) for creating the custom OS image for portable use.

19. The machine-readable storage medium of claim 17, further comprising instructions that, when executed, cause the processor to receive the policy.

20. The machine-readable storage medium of claim 17, further comprising instructions that, when executed, cause the processor to prohibit the OS image to boot the user device to.

* * * * *